(12) United States Patent
Tataroiu et al.

(10) Patent No.: US 9,819,740 B2
(45) Date of Patent: *Nov. 14, 2017

(54) CONTENT ITEM SYNCHRONIZATION BY BLOCK

(71) Applicant: Dropbox, Inc., San Francisco, CA (US)

(72) Inventors: Bogdan-Cristian Tataroiu, Bucharest (RO); Nipunn Koorapati, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,468

(22) Filed: Nov. 22, 2016

(65) Prior Publication Data
US 2017/0078395 A1  Mar. 16, 2017

Related U.S. Application Data

(63) Continuation of application No. 14/162,528, filed on Jan. 23, 2014, now Pat. No. 9,509,747.

(51) Int. Cl.
*G06F 15/16* (2006.01)
*H04L 29/08* (2006.01)
(Continued)

(52) U.S. Cl.
CPC .......... *H04L 67/1097* (2013.01); *H04L 67/02* (2013.01); *H04L 67/06* (2013.01);
(Continued)

(58) Field of Classification Search
None
See application file for complete search history.

(56) References Cited

U.S. PATENT DOCUMENTS 5,990,810 A    11/1999  Williams
6,381,674 B2 *  4/2002  DeKoning ............ G06F 3/0626
                                             711/113
(Continued)

OTHER PUBLICATIONS

Syncovery: "Block Level Copying," 2 pages, Syncovery, [Online] [Retrieved on May 22, 2014] Retrieved from the Internet<URL: http://www.syncovery.com/block-level-copying/>.
(Continued)

*Primary Examiner* — Jeffrey R Swearingen
(74) *Attorney, Agent, or Firm* — Fenwick & West LLP

(57) ABSTRACT

A content management system synchronizes content items across client computing systems. The content items are transmitted to the content management system and managed as blocks of data with a fixed size. When a new content item is added to synchronized data at a client, the client transmits the blocks and a blocklist to the content management system. The content management system uses the blocklist to determine blocks expected to be received at the content management system and the client begins to transmit blocks of the content item to the content management system. When blocks received at the content management system match expected blocks, the content management system notifies receiving clients to begin receiving blocks for the content item, prior to receipt of all blocks on the blocklist at the content management system. This enables content items to begin synchronization across clients prior to actual entry of the content item into the content management system.

20 Claims, 4 Drawing Sheets

(51) Int. Cl.
*H04N 21/83* (2011.01)
*H04N 21/278* (2011.01)

(52) U.S. Cl.
CPC ....... *H04L 67/1095* (2013.01); *H04N 21/278* (2013.01); *H04N 21/83* (2013.01)

(56) References Cited

U.S. PATENT DOCUMENTS

| | | | |
|---|---|---|---|
| 7,035,847 | B2 | 4/2006 | Brown et al. |
| 7,526,577 | B2 * | 4/2009 | Pinkerton ........... H04L 12/4641 370/229 |
| 7,865,571 | B2 | 1/2011 | Ho et al. |
| 8,140,473 | B2 | 3/2012 | Sun et al. |
| 8,417,794 | B2 | 4/2013 | Zanger et al. |
| 9,509,747 | B2 * | 11/2016 | Tataroiu ................. H04L 67/02 |
| 2008/0005195 | A1 | 1/2008 | Li |
| 2010/0332401 | A1 | 12/2010 | Prahlad et al. |
| 2012/0185448 | A1 | 7/2012 | Mensch et al. |
| 2014/0006465 | A1 | 1/2014 | Davis et al. |
| 2014/0325024 | A1 | 10/2014 | Lyle et al. |

OTHER PUBLICATIONS

Barr, J., "Amazon S3: Multipart Upload," Nov. 10, 2010, 3 pages, [Online] [Retrieved on Feb. 3, 2015] [Retrieved from the Internet]<URL:https://aws.amazon.com/blogs/aws/amazon-s3-multipart-uplo- ad/>.

PCT International Search Report and Written Opinion, PCT Application No. PCT/IB2014/066566, Feb. 11, 2015, 11 pages.

United States Office Action, U.S. Appl. No. 14/162,528, dated Feb. 4, 2016, 16 pages.

United States Office Action, U.S. Appl. No. 14/162,528, dated Aug. 10, 2015, 15 pages.

United States Office Action, U.S. Appl. No. 14/162,528, dated Jan. 15, 2015, 14 pages.

United States Office Action, U.S. Appl. No. 14/162,528, dated May 5, 2014, 15 pages.

United States Advisory Action, U.S. Appl. No. 14/162,528, dated Mar. 26, 2015, 3 pages.

\* cited by examiner

CONTENT ITEM SYNCHRONIZATION BY BLOCK

CROSS REFERENCE TO RELATED APPLICATIONS

This application is a continuation of U.S. application Ser. No. 14/162,528, filed Jan. 23, 2014, now U.S. Pat. No. 9,509,747, which is incorporated by reference in its entirety.

BACKGROUND

This invention relates generally to content item synchronization, and particularly to synchronization of a document by synchronizing blocks of a content item.

Content management systems enable users to share content items from one client to another client. The clients are computing devices that provide content items to the content management system for storage and synchronization with other clients. The other client may be operated by another user or may be a device registered or managed by the same user. When new content items are added to local storage at a client, the client provides the document with the content management system. When a client uploads a new content item to the content management system, the content management system receives the content item from the uploading user and associates the content item with a namespace. The namespace is associated with other clients and users that are synchronized with content items associated with the namespace. The clients and users associated with the namespace maintain a local storage of the documents associated with the namespace. Only after the entire content item is received by the content management system, is the content item synchronized with other clients. Consequently, it is only after the entire content item is committed to the namespace does the content management system notify other clients associated with the namespace that a new content item is available. This is the case with both a new content item added to the client that did not previously exist in the namespace, and with modified versions of an existing content item. The content management system notifies clients to synchronize the content item with the local storage at the client. Accordingly, because the content management system waits for the entire content item to be committed prior to notifying clients, for larger content items there can be a significant delay between completing the commit to the content management system and the content item being available at another client.

SUMMARY

A content management system is configured to receive portions of a content item from a source client device, and begin synchronizing those portions to other client devices prior to receipt of the entire content item from the source client device, thereby enabling the other client devices to have early access to the content item. The content management system stores each content item as a set of blocks, with each block identified by a unique block identifier. The content management system maintains a blocklist for each content item that includes a list of the block identifiers associated with the blocks for a content item. The blocklist may also define how to reconstitute the set of blocks into a content item by including an ordering of the blocks in the reconstituted content item, and optionally a decoding protocol or decompression algorithm for the blocks.

When a client provides a content item to store to the content management system, the client device processes the content item into blocks and generates the block identifiers for the blocks to create a blocklist. The client device provides the blocklist to a metadata server and designates a namespace for storing the content item. The metadata server queries a block server to determine if the block server maintains a copy of the blocks identified by the blocklist. If the block server does not have the blocks, the metadata server associates the blocklist with a list of pending blocks identified from the block identifiers in the blocklist for the namespace and indicates to the client device that the blocks are not yet stored. Next, the client initiates transmission of the blocks to the block server for storage. As blocks are received by the block server, the block server provides the block identifiers of the received blocks to the metadata server. The metadata server determines whether the block identifier of blocks received by the block server match any pending blocks and the associated namespace for the received blocks. When received blocks match the pending block list, a notification server is notified of the receipt of a block, and the notification server identifies one or more additional clients synchronized to the namespace. The notification server notifies the additional clients that new blocks are available. The notification of the additional clients can take place while the source client is still transmitting further blocks of the content item to the content management system.

After being notified, the additional client requests the new blocks from the block server, which can transmit these new blocks while still receiving the further blocks. When blocks are received from the block server, the additional client stores the blocks in a block cache. The additional client also receives a blocklist for the content item. As the blocks are received that match the blocklist and are sufficient to reconstruct the content item, the additional client reconstructs the content item and adds the content item to a local content item storage available for the client device to use. In one embodiment, the additional client reconstructs a partial content item prior to receiving all blocks of the content item.

The features and advantages described in this summary and the following detailed description are not exhaustive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
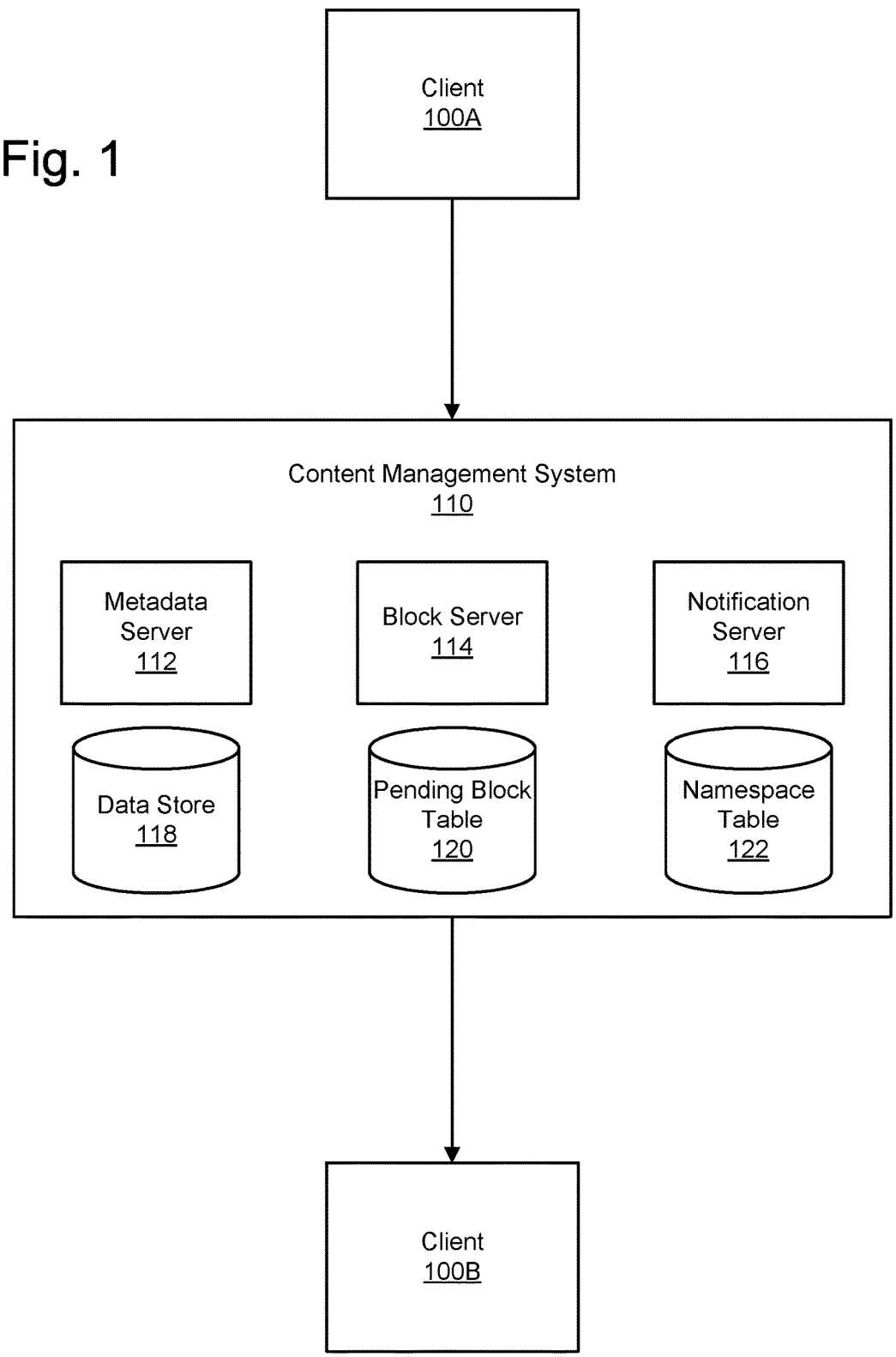
FIG. 1 is an environment in which clients synchronize content items using a content management system according to an embodiment.

FIG. 1 is an environment in which clients 100 synchronize content items using content management system 110 according to an embodiment. Clients 100 communicate with a content management system 110 to synchronize content items between client 100A and client 100B. In this example, client 100A provides a content item to content management system 110. Content management system 110 notifies client 100B and synchronizes the content item received from client 100A with local content stored at client 100B.

In this embodiment, each client 100 maintains a local copy of content synchronized by content management system 110. Content management system 110 associates content items with a "namespace" corresponding to a set of content items. The namespace may also designate a directory structure into which the content items are organized. Content management system 110 also associates the namespace with clients with various rights to access, modify, and delete the set of content items. When clients 100 are synchronized to a namespace, the clients store a local copy of content items associated with the namespace and organize the content items according to the directory structure, if available. Clients 100 may be associated with separate users of content management system 110, or clients 100 may each be individually registered to the same user. In this way, users share content with other users by sharing a namespace, and a user can synchronize documents and content items across multiple of the user's client devices. The content items stored at content management system 110 can include any type of content item, including documents, data, movies, music, and so forth. The content item may also be a folder or other mechanism of grouping content items together, such as a collection, playlist, album, and so forth.

Clients 100 communicate with content management system 110 through a network, not shown, which can be any suitable communication means. These may include any wired or wireless technologies, including various servers, and routers, and is typically via the internet.

Each client 100 is a computing device, such as a desktop, laptop, tablet, mobile device, or other system that maintains that maintains a local copy of shared data synchronized with content management system 110 and with other clients. The shared data may be synchronized only with clients associated with a single user, or may be synchronized to clients associated with multiple users. Client 100 includes modules and applications for manipulating and adding data to the shared data, as further described with respect to FIG. 2. When data is modified or added to the shared data at client 100, the modifications to the shared data are transmitted to content management system 110. Client 100 is also configured to receive notifications from content management system 110. When the client 100 receives a notification, client 100 queries content management system 110 for modifications to shared data. When the shared data is modified, the client 100 requests the modifications from content management system 110 to store shared data on client 100.

In the example shown in FIG. 1, client 100A adds an additional content item to the shared data. The additional content item is transmitted to content management system 110. Content management system 110 notifies client 100B that the additional content item is in the shared data, and client 100B retrieves the additional content item from content management system 110. Content management system 110 maintains a list of content items and pending blocks that are expected to be received at content management system 110, and notifies client 100B to download blocks corresponding to a content item as blocks are received by content management system 110. Pending blocks are those blocks that correspond to a content item that content management system 110 expects to receive and are used to identify blocks that may be provided to receiving client 100B prior to a content item being committed to content management system 110.

This enables a content item to be available at client 100B faster than had content management system 110 waited for the entire content item to be received, as is conventional. In addition, certain content items, such as media content items, can be partially reconstructed by client 100B prior to receipt of all blocks associated with the content item and permits the content item to be used prior to receipt by client 100B of all blocks for the content item. To manage in-transit content items, content management system 110 retains a list of pending blocks along with the namespace associated with the pending blocks. When a pending block is received, clients associated with the namespace are notified and can initiate a transfer for the received block. Thus, uploading clients (providing a new content item) and downloading clients (receiving the new content item) may asynchronously transfer blocks to content management system 110. These functions and additional features are further described below.

To manage storage and synchronization of content items, content management system 110 includes various modules and data stores. Content management system 110 stores content items in data store 118. Content items are stored in fixed size portions termed a block. The size of a block varies according to the implementation, and in one embodiment, the blocks are 4 megabytes in size. Thus, a small content item is stored as a single block, while a large content item may be split up into dozens, hundreds, or more blocks for storage at content management system 110. A blocklist associated with each content item describes the blocks and ordering of the blocks that make up the content item. The blocks are described using a block identifier, which in one embodiment is a hash of the contents of the block, for example using an MD5 or SHA-1 hash. Each content item is associated with metadata describing the grouping of blocks into the content item along with other data about the content item, such as the content item name of the content item to which the block belongs, a namespace associated with the content item, and other data. The metadata includes a blocklist that defines the blocks in the content item and an ordering of the blocks in the content item.

Pending block table 120 maintains a list of pending blocks expected to be received at the content management system. Pending block table 120 stores an association between blocks (identified by block identifiers) that clients 100 indicate will be transmitted and the namespaces to which the blocks belong. Namespace table 122 stores data associating individual content items with namespaces and maintains data associating each namespace with clients. An authorization module (not shown) establishes and maintains associations between namespaces and clients stored in namespace table 122. The authorization module validates uses (e.g., by login and password) and the client device being operated, adding an operated device to the namespace table 122.

Content management system 110 includes metadata server 112, block server 114, and notification server 116. While described here as separate servers, each of these components may be implemented as a module of a single computer system or computer server, rather than as a separate servers. Thus, alternate embodiments include a metadata module, block management module, notification module, and the like to carry out the described functions and services. The configuration of content management system 110 using these modules instantiates content management system 110 as a particular computer system able to perform the functions described herein.

Metadata server 112 is responsible for managing a request from the client to add ("commit") a new content item to content management system 110, and is one means for performing this function. For the purposes of this disclosure, a "new" content item includes a content item that has not previously been added to content management system 110 and a modified version of an existing content item. A request from client 100A includes metadata describing the content item, a namespace and a blocklist designating the blocks belonging to the new content item. Metadata server 112 determines whether content management system 110 currently has blocks corresponding to the blocks in the blocklist. In one embodiment, block server 114 is responsible for maintaining blocks stored to data store 118 and also determines whether the blocks in a blocklist are maintained in data store 118. Thus, the metadata server 112 queries the block server 114 by passing in the blocklist. If the block server 114 responds to the metadata server 114 that the blocks in the block list are not stored in data store 118, metadata server 112 indicates to client 100A that the content item failed to commit. Metadata server 112 adds the block identifiers in the blocklist that were not located in data store 118 to pending block table 120 along with the namespace. In this way, content management system 110 expects to receive the blocks from a client based on an identifier of the blocks in pending block table 120. When the blocks designated in the blocklist are in data store 118, for example because the content item is a copy of a content item that already exists in content management system 110, content management system 110 associates the content item with the namespace that uploading client 100A designated and notifies uploading client 100A that the commit succeeded.

Metadata server 112 also receives requests to synchronize content items from client 100. Metadata server 112 maintains a record of the last time that client 100 synchronized with content management system 110. When a request is received from client 100 to synchronize, metadata server 112 determines any content items that have been committed to namespaces synchronized to that client 100 since the last synchronization time stamp. In addition, metadata server 112 determines any pending blocks that have been received since the last synchronization time stamp. If so, metadata server 112 provides a download list of block identifiers indicating blocks for client 100 to request from block server 114. In one embodiment, metadata server 112 transmits the metadata and blocklist of the pending content item associated with block identifiers to permit client 100 to initiate reconstruction of the content item.

Block server 114 receives blocks transmitted by a client and stores the received blocks to data store 118. As blocks are stored, block server 114 determines whether any of the received blocks are listed in pending block table 120. If the received block is in pending block table 120, block server 114 determines the namespace associated with the received block and alerts notification server 116, providing notification server 116 with the namespace information. In one embodiment, the block identifier of the received block is also provided to notification server 116. In another embodiment, block server 114 does not alert notification server 116 directly, instead block server 114 determines the block identifier of the received block, and transmits the block identifier to metadata server 112. In this embodiment metadata server 112 determines the associated namespace and provides the namespace information and optionally the block identifier of the received block to notification server 116. In one embodiment, block server 114 or metadata server 112 also provides the blocklist for the content item to notification server 116. Clients 100 also request blocks from block server 114. Block server 114 retrieves requested blocks from data store 118 and transmits the requested blocks to client 100. Block server 114 is one means for performing these functions.

Notification server 116 is responsible for communicating with clients 100, and particularly with notifying clients that new data is available, and is one means for performing this function. Since data stored at content management system 110 may not frequently change, many clients are in infrequent contact with the content management system 110. When data at content management system 110 has changed, the notification server 116 notifies client 100 to retrieve the new content. To perform this function, notification server 116 maintains a list of clients 110 associated with each namespace at namespace table 122. When the notification server 116 receives an alert from block server 114 or metadata server 112 that a new block is available for a given namespace, notification server 116 identifies clients associated with the namespace from namespace table 112. Notification server 116 notifies client(s) 100 associated with the namespace to wake client(s) 100 and indicate that new blocks are available for the identified namespace. In one embodiment, the notification server 116 notifies the client(s) that a change has occurred in a namespace associated with the client. In another embodiment, when notifying client(s) 100, notification server 116 transmits a download list of block identifier(s) corresponding to the received blocks. In one embodiment, notification server 116 batches received blocks until a threshold number of block identifiers is reached (e.g., 5, 10, or 20 blocks). In one embodiment, notification server 116 transmits the metadata and blocklist of the content item associated with the received block identifiers to permit the client 100 to initiate reconstruction of the content item.

Figure 2:
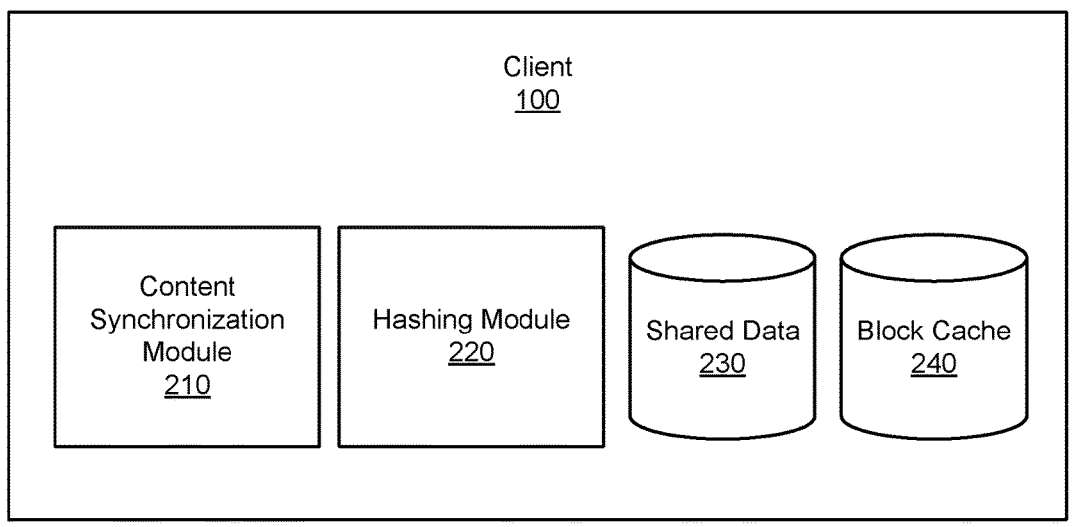
FIG. 2 shows components of a client according to an embodiment.

FIG. 2 shows components of client 100 according to an embodiment. Client 100 includes various modules and data stores for synchronizing data with content management system 110. Client 100 includes content synchronization module 210, hashing module 220, shared data 230, and block cache 240. The configuration of client 100 using these modules instantiates client 100 as a particular computer able to perform the functions described herein. Shared data 230 is data that has been synchronized with the content management system 110, and includes content items received from content management system 110. When users add, modify, or delete content items in shared data 230, those changes are synchronized with content management system 110. Block cache 240 stores blocks received from content management system 110 that are not yet part of a content item. While described as a "cache," the blocks maintained by block cache 240 may be stored in a volatile or non-volatile memory and constitute a holding area for blocks prior to the blocks being added to a content item. However, when blocks are held in block cache 240 past a threshold time or no further blocks are received related to the content item within a threshold time, the blocks are cleared from block cache 240.

Hashing module 220 receives blocks from a requesting module and generates block identifiers for the block. In one embodiment, hashing module 220 hashes the data in the block, such that the block identifier is a hash value of the block. Such hashing is performed by any suitable hashing algorithm, such as MD5 or SHA-1, for example. In other embodiments, the block identifier is generated by any suitable method for generating a unique (or near-unique) identification of the block that may be used to identify the block across clients 100 and content management system 110. Hashing module 220 then returns the block identifier to the requesting module.

Content synchronization module 210 manages communication with content management system 110. When a content item is modified by a user in shared data 230, content synchronization module 210 generates metadata describing the content item, and separates the content item into blocks and passes the blocks to hashing module 220 to receive block identifiers for each content item. When content synchronization module 210 separates the blocks of the content item, the blocks may be encoded or encrypted. Thus, when separating the blocks, content synchronization module 210 identifies an order of the blocks and may also identify information describing the encoding or encryption scheme, and any other information necessary to reconstruct the content item from the blocks.

Content synchronization module 210 adds the block identifiers to a blocklist for the content item and the metadata and blocklist are transmitted to the metadata server 112 of the content management system 110. When metadata server 112 indicates that the content item failed to commit (i.e., the content item is not currently stored in content management system 110), content synchronization module 210 transmits the blocks associated with the content item to the block server 114. The indication from content management system 110 may indicate specific blocks that failed, or may indicate that the content item as a whole failed. The failed blocks (or, for the content item, all of the blocks) are transmitted to block server 114.

Content synchronization module 210 also synchronizes content updated at content management system 110. When notification server 116 notifies content synchronization module 210 that there is new data for a given namespace, content synchronization module 210 communicates with metadata server 112 to receive the download list of block identifiers indicating blocks available to download from block server 114. In one embodiment, the notification includes the download list of block identifiers. Content synchronization module 210 may also receive metadata for a content item and the complete blocklist of the content item, rather than the download list of new blocks. Content synchronization module 210 communicates with block server 114 to retrieve the specified blocks to download and stores the retrieved blocks in block cache 240. When content synchronization module 210 receives a blocklist, content synchronization module 210 determines whether blocks are stored in block cache 240 associated with the blocklist. When a sufficient number of blocks to reconstruct at least a partial content item are stored in block cache 240, content synchronization module 210 reassembles the content item using the blocklist. A sufficient number of blocks may vary based on the block size and the content item type, or other characteristics of the content item, and may be specified in the blocklist or content item metadata. The blocklist may also designate whether a partial content item may be constructed, such as for certain content items or content item types. For example, a movie content item may be partially constructed and permit the movie to be played without the all of the blocks for the entire movie having been received and stored. In this case, the blocklist is maintained after the partial content item is created and the content item is updated when additional blocks corresponding to further portions of the content item are received.

Figure 3:
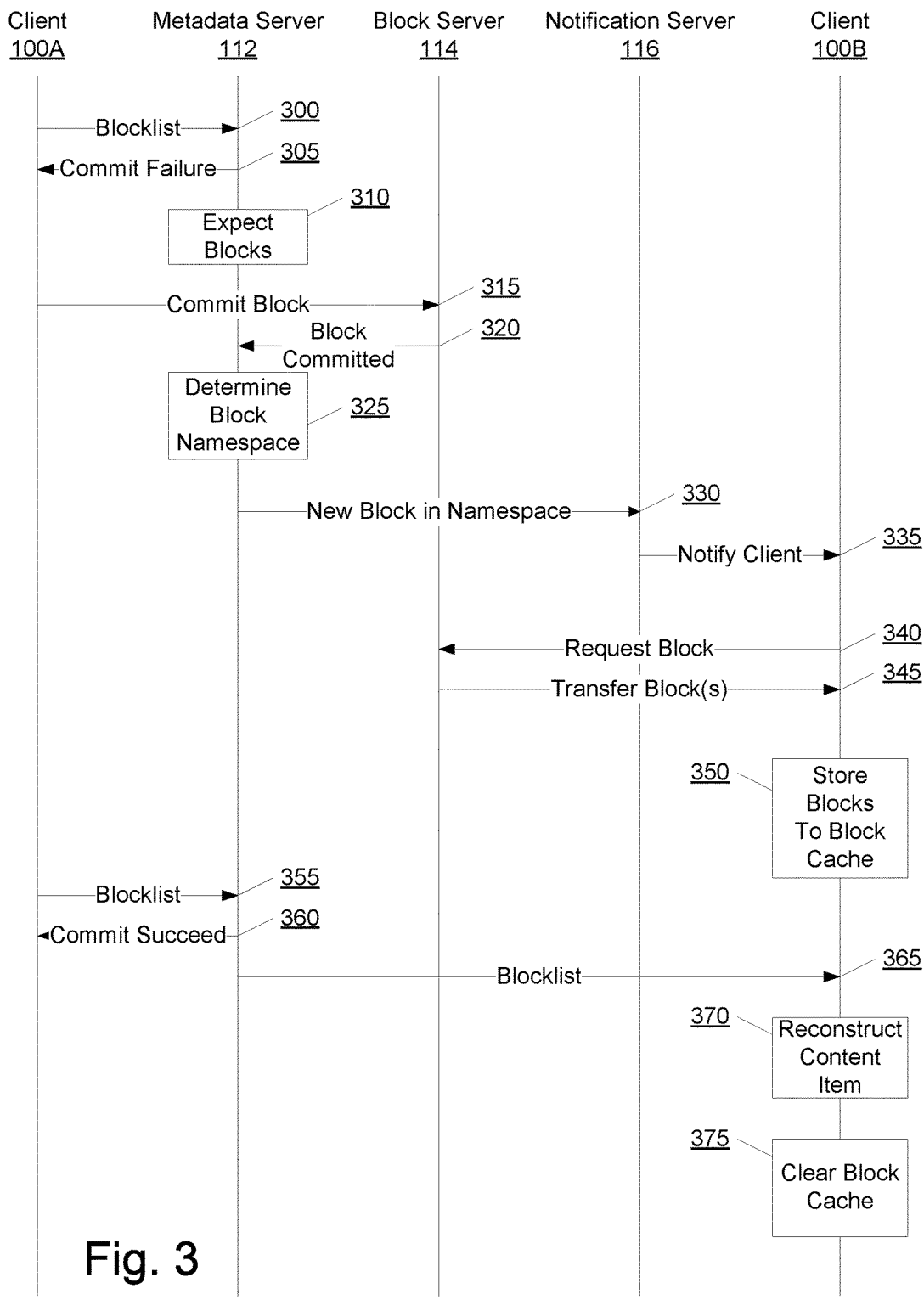
FIG. 3 is an interaction diagram of content synchronization according to one embodiment.

FIG. 3 is an interaction diagram of content synchronization according to one embodiment. Content items are synchronized between client 100A (adding a new content item) and client 100B (receiving the new content item) using components of content management system 110 in an asynchronous manner, such that client 100B can receive portions of the new content item while client 100A is adding the new content item to the system 110. Client 100A may be called the uploading or source client, and client 100B may be called the receiving or target client. Client 100A receives a new content item for synchronization or a modification of an existing content item, for example a content item that has been created (or modified) locally on client 100A in an application such as a word processor, spreadsheet, code editor, video editor, image editor, or the like, or a content item that has been downloaded by a browser from a network location, or included as an email attachment. Client 100A creates a blocklist describing the content item by determining blocks comprising the content item and associated block identifiers. Client 100A transmits 300 the blocklist to metadata server 112 in a commit request including a namespace for the content item. Client 100A may also transmit the metadata describing the content item in the commit request. Since the content item is new, metadata server 112 will determine that it does not have the content item by querying block server 114 with the block list, in the manner described above. Metadata server 112 transmits 305 a commit failure to client 100A. Metadata server 112 stores 310 the blocklist in pending block table 120 along with the namespace for the content item, thus indicating which blocks are expected to be received in the future. The blocklist may be stored 310 prior to alerting client 100A of the commit failure 310.

Next, client 100A begins committing blocks 315 to block server 114. As each block is committed (or as groups of blocks are committed) by block server 114 to data store 118, block server 114 alerts 320 metadata server 112 that the block has been received and stored. The alert includes a block identifier associated with the received block(s). Metadata server 112 determines 325 the namespace associated with the block by querying the pending block table 120 with the block identifier. Metadata server 112 alerts 330 notification server 116 that a new block(s) is in the determined namespace. Notification server 116 determines clients associated with the namespace by querying namespace table 122 (not shown).

Next, notification server 116 notifies 335 client 100B that a new block is ready for synchronization. Notification server 116 may pass client 100B a download list of block identifiers for the newly received block, as further described above, or client 100B may request synchronization with metadata server 112, which alternatively provides the download list (not shown). The notification server 116 or metadata server 112 may also transmit the blocklist and associated metadata for the content item with the download list, which may permit client 100B to partially reconstruct the content item. Using the download list, client 100B requests 340 these blocks on the list from block server 114, which transfers 345 the blocks to client 100B. As the blocks are received, client 100B stores 350 the blocks to block cache 240. As blocks are committed 315 by client 100A, notifications are transmitted 335 to client 100B until all blocks have been committed to the content management system 110 and received by client 100B.

Next, client 100A, having transmitted the blocks associated with the content item, attempts to commit 355 the blocklist. Now that the blocks are stored in the data store 118, metadata server 112 is able to successfully commit the content item, since when it queries the block server 114 with the blocklist, the block server 114 will match the block identifiers with the stored blocks in the data store 118. The metadata server 112 communicates 360 the commit to client 100A. Metadata server 112 communicates the committed content item information to client 100B, and if it has not previously been communicated to client 100B, metadata server 112 communicates 365 the blocklist of the committed content item to client 100B. Client 100B uses the blocklist to reconstruct 370 the content item using blocks in block cache 240 and adds the content item to shared data 230. Periodically, client 100B clears 375 block cache 240 of blocks that are not associated with a content item.

In the embodiment where the download list is transmitted with the blocklist, client 100B may reconstruct portions of the content item as blocks corresponding to the blocklist are stored 350. As the blocklist defines an order to the blocks in the list, when blocks are received that are the subsequent blocks in the order to blocks already received, the received blocks are added to the partial content item. Many partial content items may be useable, such as movies, books, or other media that are useable prior to receiving the entire content item.

Figure 4:
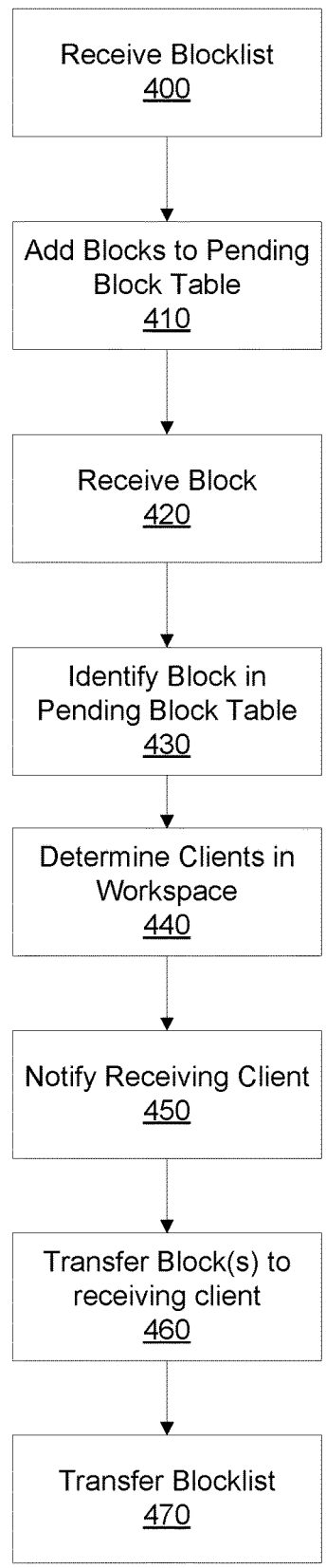
FIG. 4 is a method for content synchronization of partial content items according to one embodiment.

FIG. 4 is a method for content synchronization of partial content items according to one embodiment. This method is performed, in one embodiment, by components of content management system 110. Content management system 110 receives 400 a blocklist from client 100 indicating a content item to be added or modified in content management system 110 along with an associated namespace for the content item and block identifiers. The blocklist is used to add block identifiers 410 to a pending block table. As content management system 110 receives 420 blocks of data, content management system 110 identifies 430 the received blocks in the pending block table. Using the namespace associated with the received blocks in the pending block table, content management system 110 identifies 440 clients 100 associated with the namespace. Content management system 110 notifies 450 the identified clients 100 with a download list of blocks received by the content management system available for client 100. Content management system 110 may also transmit the blocklist and any other information relating to content item reconstruction to receiving client 100. Content management system 110 proceeds to transfer 460 received blocks to the receiving client 100, which may be responsive to a request from receiving client 100. As blocks are received 420 by content management system 110, clients are identified 440 and notified 450 until all blocks of the content item have been received by content management system 420 and the content item is committed. If the blocklist has not previously been transferred to the receiving clients, the blocklist is transferred 470.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving, at an online content management system from a remote uploading client computer via a network, a blocklist of block identifiers for a content item and a first block corresponding to a first block identifier in the blocklist; and
responsive to receiving the blocklist of block identifiers and the first block at the online content management system:
identifying, by the online content management system, a remote receiving client computer to receive the content item; and
sending, by the online content management system, the blocklist and the first block of the content item to the remote receiving client computer prior to receipt by the online content management system from the remote uploading client of all blocks corresponding to the blocklist of block identifiers.

2. The method of claim 1, wherein identifying a remote receiving client computer comprises identifying a client computer based on a namespace associated with the content item.

3. The method of claim 2, further comprising:
maintaining a namespace table storing associations between namespaces and client computers, wherein each namespace in the namespace table is assigned a namespace identifier; and
obtaining a namespace identifier associated with the content item;
wherein identifying the receiving client computer comprises identifying a client computer associated with the namespace using the namespace table and the namespace identifier.

4. The method of claim 3, wherein obtaining the namespace identifier comprises receiving the namespace identifier from the remote uploading client computer.

5. The method of claim 1, further comprising receiving, by the online content management system, a second block corresponding to a second block identifier in the blocklist and transmitting the second block to the receiving client computer via the network.

6. The method of claim 1, wherein the blocklist defines an order for reassembling blocks of data into the content item.

7. The method of claim 1 further comprising:
prior to transmitting the blocklist and the first block, notifying, by the online content management system, the receiving client computer that the first block has been received.

8. A content management system comprising:
a processor;
a metadata server stored in a memory and executed by the processor and configured to receive a blocklist for a content item from a remote uploading client computer via a network, the blocklist identifying a list of block identifiers for a plurality of blocks for the content item;
a block server stored in the memory and executed by the processor and configured to store received blocks of data and alert the metadata server when a block is received, and transmit stored blocks to a remote receiving client computer via the network; and
a notification server stored in the memory and executed by the processor and configured to notify the receiving client computer that a block of data has been received, wherein notifying the receiving client computer occurs prior to receipt by the block server of all blocks corresponding to the blocklist;
wherein the metadata server is further configured to, in response to an alert from the block server, determine whether the received block corresponds to a block identifier in the blocklist.

9. The system of claim 8, further comprising
a namespace table storing associations between namespaces and client computers; and
wherein the metadata server is further configured to identify the receiving client computer using the namespace table.

10. The system of claim 9, wherein the metadata server is further configure to obtain a namespace identifier for the content item and to query the namespace table using the obtained namespace identified to identify the receiving client computer.

11. The system of claim 10, wherein obtaining the namespace identifier comprises receiving the namespace identifier from the remote uploading client computer.

12. The system of claim 8, wherein the block server is further configured to transmit blocks to the receiving client computer after receiving a request for the blocks from the receiving client computer.

13. The system of claim 8, wherein the notification server is further configured to notify the receiving client computer as each block of data is received.

14. A non-transitory computer-readable medium containing instructions which when executed by a processor cause the processor to execute the steps of:
receiving, at an online content management system from a remote uploading client computer via a network, a blocklist of block identifiers for a content item and a first block corresponding to a first block identifier in the blocklist; and
responsive to receiving the blocklist of block identifiers and the first block at the online content management system:
identifying, by the online content management system, a remote receiving client computer to receive the content item; and
sending, by the online content management system, the blocklist and the first block of the content item to the remote receiving client computer prior to receipt by the online content management system from the remote uploading client of all blocks corresponding to the blocklist of block identifiers.

15. The medium of claim 14, wherein identifying a remote receiving client computer comprises identifying a client computer based on a namespace associated with the content item.

16. The medium of claim 15, wherein the instructions further cause the processor to perform steps comprising:
maintaining a namespace table storing associations between namespaces and client computers, wherein each namespace in the namespace table is assigned a namespace identifier; and
obtaining a namespace identifier associated with the content item;
wherein identifying the receiving client computer comprises identifying a client computer associated with the namespace using the namespace table and the namespace identifier.

17. The medium of claim 16, wherein obtaining the namespace identifier comprises receiving the namespace identifier from the remote uploading client computer.

18. The medium of claim 14, wherein the instructions further cause the processor to perform steps comprising receiving, by the online content management system, a second block corresponding to a second block identifier in the blocklist and transmitting the second block to the receiving client computer via the network.

19. The medium of claim 14, wherein the blocklist defines an order for reassembling blocks of data into the content item.

20. The medium of claim 14, wherein the instructions further cause the processor to perform steps comprising:
prior to transmitting the blocklist and the first block, notifying, by the online content management system, the receiving client computer that the first block has been received.

* * * * *